UNITED STATES PATENT OFFICE.

BJÖRN PER FERDINAND KJELLBERG, OF STOCKHOLM, SWEDEN.

PROCESS OF TREATING MINERALS CONTAINING IRON, TITANIUM, AND VANADIUM.

1,419,971. Specification of Letters Patent. Patented June 20, 1922.

No Drawing. Application filed November 3, 1919. Serial No. 335,448.

*To all whom it may concern:*

Be it known that I, BJÖRN PER FERDINAND KJELLBERG, subject of the King of Sweden, residing at 68 Kungsgatan, Stockholm, Sweden, have invented certain new and useful Improvements in the Processes of Treating Minerals Containing Iron, Titanium, and Vanadium, of which the following is a specification.

My present invention has for its object a method for treating minerals or products containing iron and one or both of the metals titanium and vanadium in order to obtain compounds of the said metals separately. The method in question is chiefly characterized by the fact that the starting material is treated with a dissolving or decomposing agent which is adapted to dissolve those of said metals which are present, and the solution is then evaporated to dryness, the product thereby obtained being in the following specification characterized as the "dry product". Then the treatment is somewhat different dependent on (a) if the dry product contains titanium.
(b) if the dry product does not contain titanium.

In case (a) the dry product is heated, however not to such high temperatures that the compounds of the above metals present are dissociated. The dry product thus heated is then treated with water of suitable temperature so as to dissolve the said metal compounds, the titanium compounds being upon the (continuous) heating of the solution precipitated while the iron and vanadium compounds, if the latter are present, remain in the solution. After the precipitated titanium compounds have been separated from the solution the latter is evaporated to dryness and the dry product, just like the dry product obtained in case (b), is roasted, so as to transform the iron into insoluble oxides. The product now obtained, (called roasted product) is then treated with a solvent for vanadium compounds if such compounds are present.

In the practical execution of the method it is convenient to use as solvent a mineral acid, principally sulphuric acid, but also other dissolving or decomposing agents, such as bisulphate of potassium, may be used.

In the following I now cite a practical example. The finely divided starting material is treated with hot sulphuric acid, the solution obtained is evaporated to dryness, and the dry product is heated in order to drive off any excess of sulphuric acid. If the starting material contains titanium said heating is not carried so far that the sulphates of iron and titanium and, it may be, also of vanadium are dissociated. The resulting product is then treated with hot water so as to dissolve said sulphates, and upon the continuous heating of the solution the titanium compounds precipitate while the sulphates of iron and, it may be, also of vanadium remain in solution. The precipitate is then separated and the solution is evaporated to dryness. The dry product is roasted so far that the iron is transformed into insoluble oxides, for instance red ochre. The roasted product is then treated with hot water mixed if wanted, with an acid or with an alkali, in order to dissolve the vanadium compounds present. The red ochre is separated and washed and the solution is treated to recover the vanadium compounds which may be purified in any convenient manner.

If the starting material does not contain titanium but only iron and vanadium, the solution obtained by treating the same with sulphuric acid is evaporated to dryness, the dry product is roasted so far that the iron is transformed into insoluble oxides and the roasted product is treated as above.

If the dissolving agent, on treating the roasted product for dissolving the vanadium compounds according to the above examples, has dissolved some iron together with the vanadium compounds, the solution can be purified from iron in the above stated manner, for which purpose the solution is evaporated to dryness and the dry product is roasted so that the iron is transformed into insoluble oxides. The roasted product is then treated with water, which may, if necessary, be mixed with an acid or with an alkali. By this means a solution is obtained which is more free from iron and which contains the vanadium compounds that, after the separation of the iron oxides, are recovered and purified in any convenient manner.

The above described method can be modified in several ways. If the starting material be poor in titanium but rich in iron and contains vanadium it may be convenient to treat the same with so much diluted sulphuric acid that the titanium is as much as possible undissolved but the iron is dissolved in greater quantities. An undissolved residue is then obtained, a product with high percentage of titanium which can be treated with more concentrated sulphuric acid in the above described manner for recovering the titanium compounds whereupon the solution, after the last mentioned compounds have been separated, is mixed with the solution obtained from the treatment of the starting material with diluted sulphuric acid. The mixed solutions are then treated for recovering iron and vanadium compounds in the above described manner.

Having now described my invention what I claim as new and desire to secure by Letters Patent is:

1. Method for treating minerals or products containing iron and one or both of titanium and vanadium for recovering compounds of said metals separately, characterized in treating the starting material with a dissolving or decomposing agent for said metals, evaporating the solution obtained to dryness, and heating the dry product without dissociating the metal compounds in the same, treating the resulting product with water, heating the solution obtained so as to precipitate the titanium compounds and separating said compounds, evaporating the solution to dryness and roasting the same so as to transform the iron into insoluble oxides and, treating the roasted product with a solvent for the vanadium compounds.

2. A modification of the method set forth in claim 1 and adapted to be used in the case that the starting material does not contain titanium but only iron and vanadium, characterized by treating the starting material with a dissolving or decomposing agent for said metals, evaporating the solution to dryness, roasting the dry product so as to transform the iron into insoluble oxides, and treating the roasted product with a solvent for vanadium compounds.

3. Method as claimed in claim 1, characterized by the fact that the solution obtained by treating the roasted product with a solvent for vanadium compounds is purified from iron by evaporating to dryness, roasting the dry product so as to transform the iron to insoluble oxides, treating the roasted product with a solvent for vanadium and recovering vanadium compounds from the said solution.

In testimony whereof I have affixed my signature in the presence of two witnesses.

BJÖRN PER FERDINAND KJELLBERG.

Witnesses:
AXEL EHRNER,
GRETA PRIEN.